Nov. 28, 1950    E. M. DELORAINE    2,531,412
SYSTEM FOR DETERMINING DISTANCE AND DIRECTION
BY ELECTROMAGNETIC WAVE ENERGY
Filed Oct. 26, 1943    3 Sheets-Sheet 1
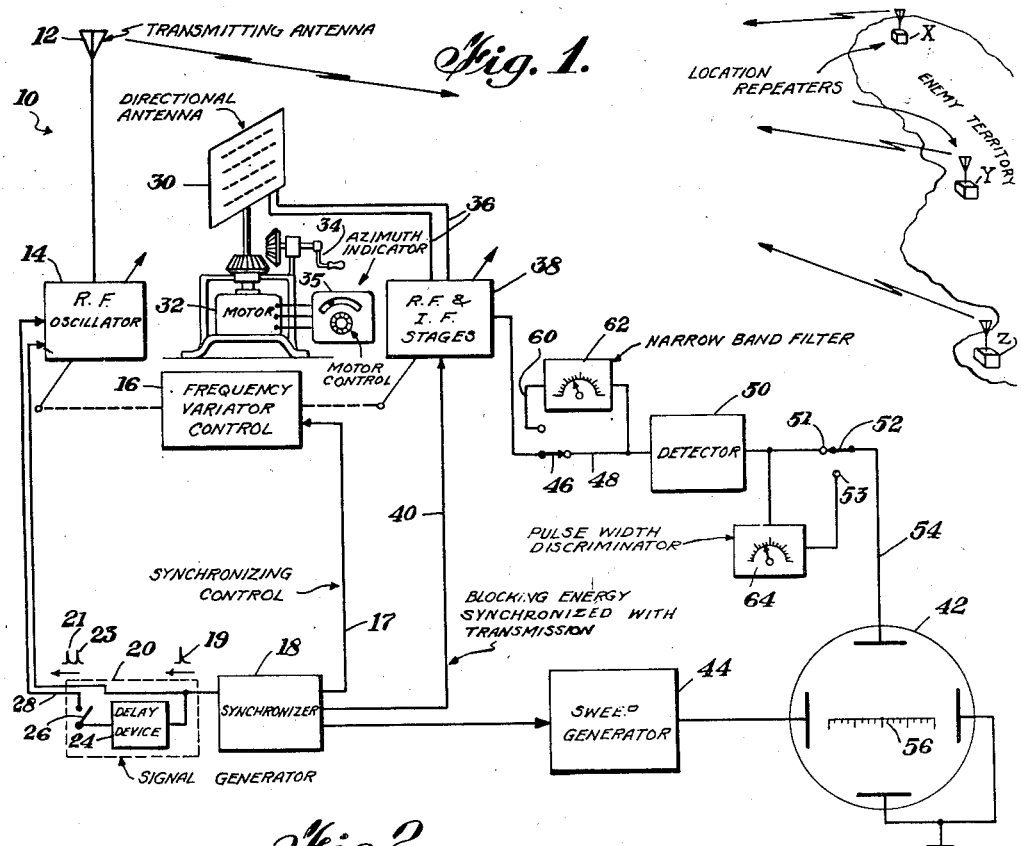
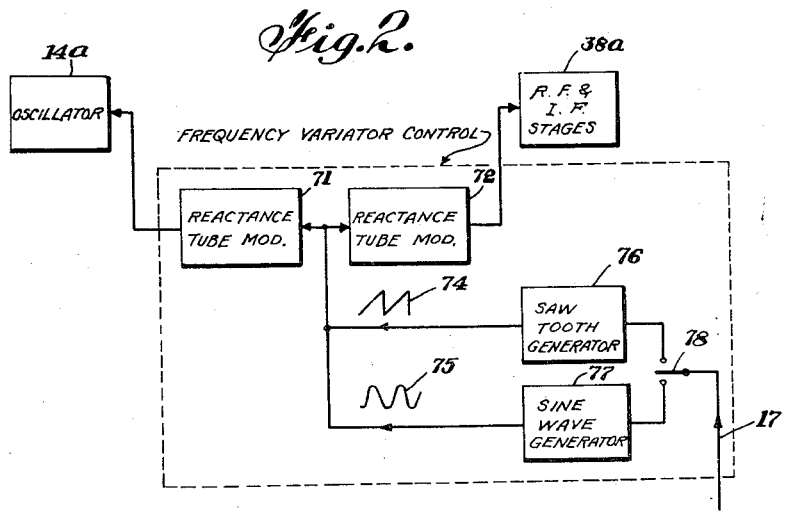
INVENTOR.
EDMOND M. DELORAINE
BY Percy P. Lantz
ATTORNEY Nov. 28, 1950 — E. M. DELORAINE — 2,531,412
SYSTEM FOR DETERMINING DISTANCE AND DIRECTION
BY ELECTROMAGNETIC WAVE ENERGY
Filed Oct. 26, 1943 — 3 Sheets-Sheet 2
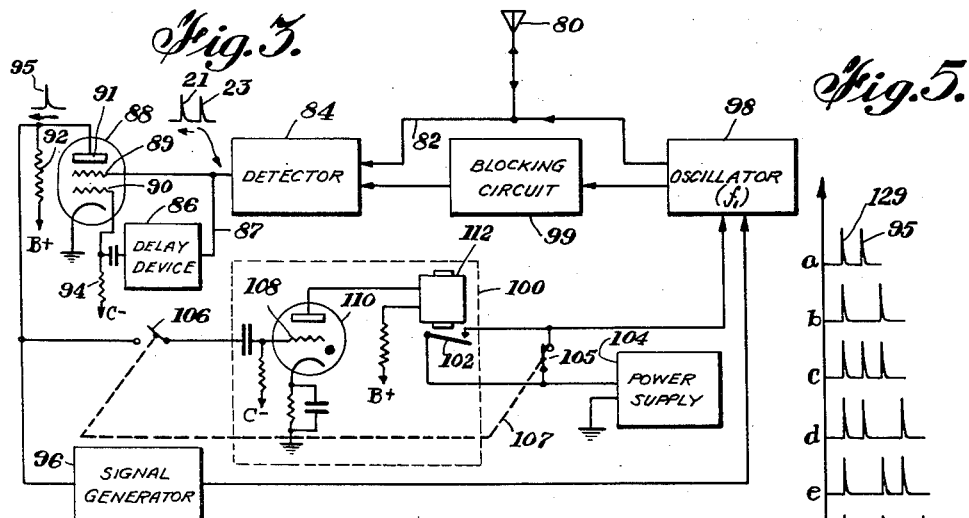
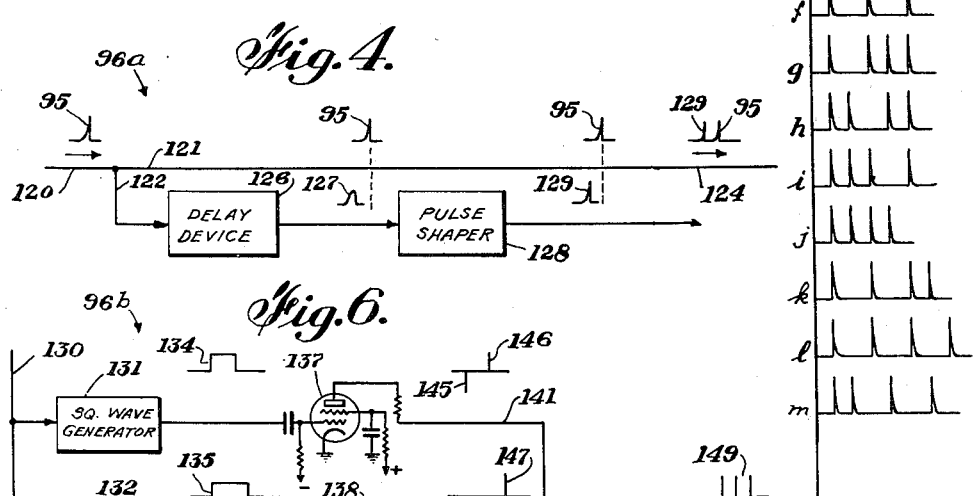
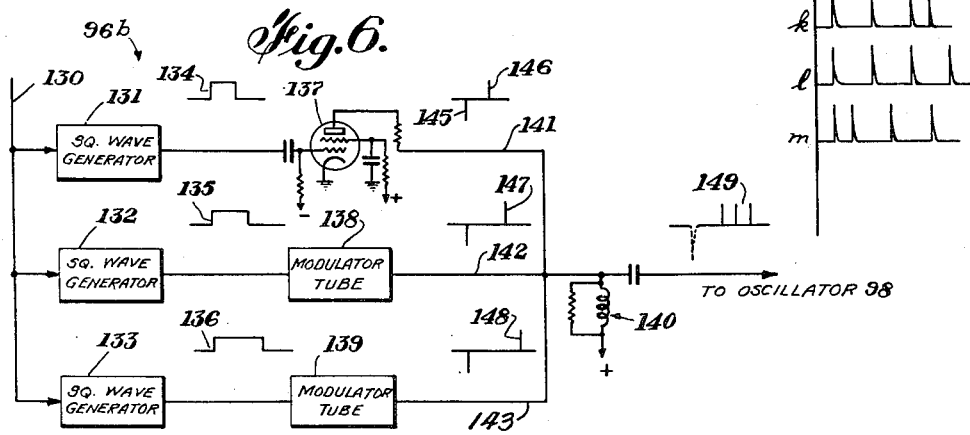
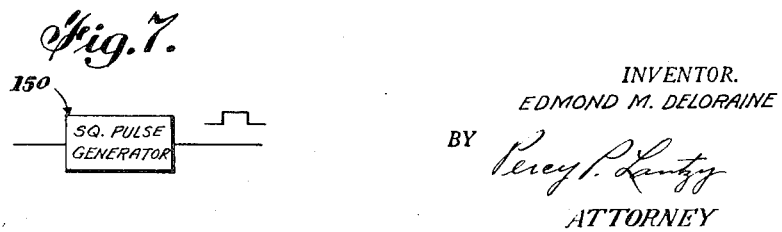
INVENTOR.
EDMOND M. DELORAINE
BY Percy P. Lantz
ATTORNEY

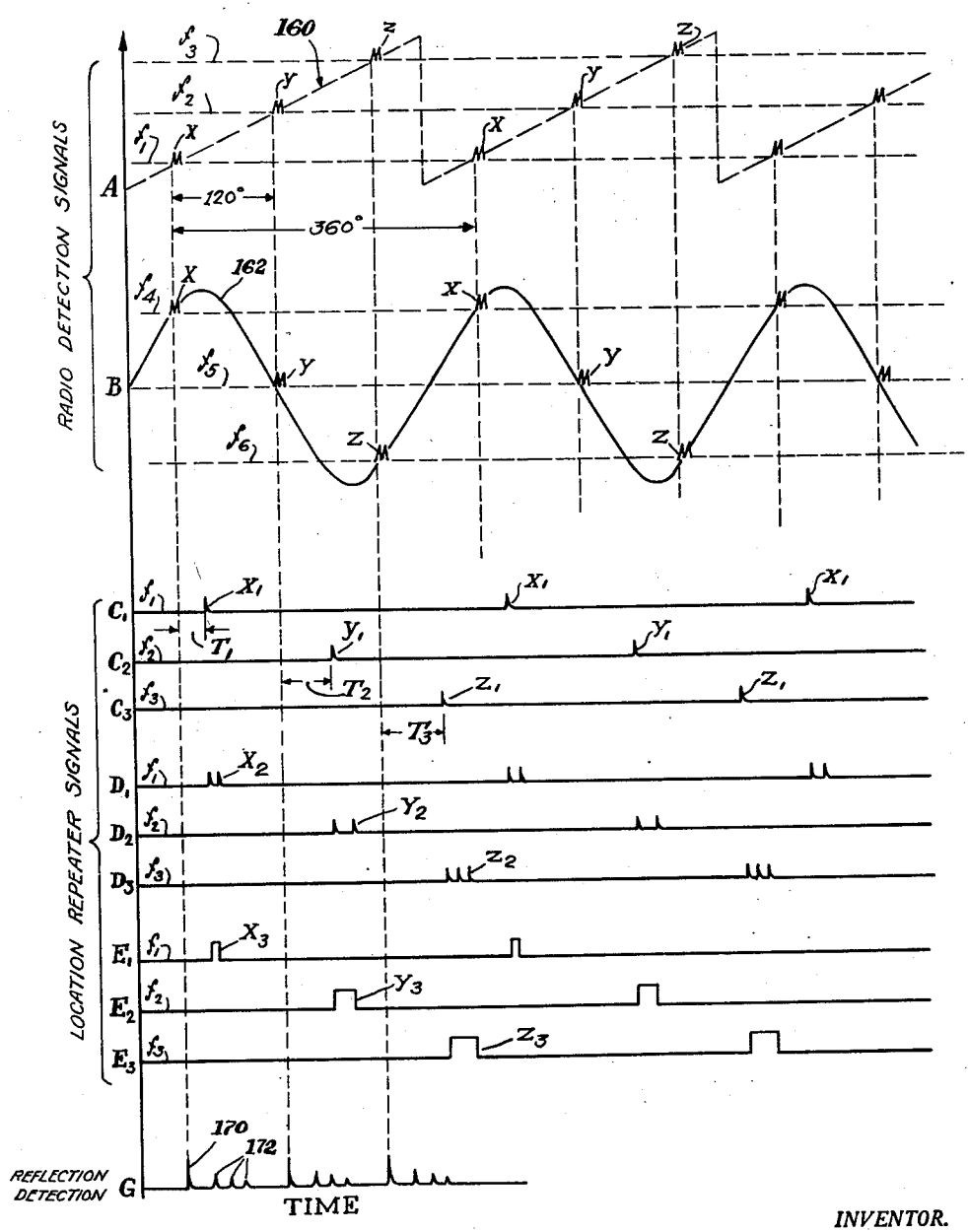

Patented Nov. 28, 1950

2,531,412

UNITED STATES PATENT OFFICE 2,531,412

SYSTEM FOR DETERMINING DISTANCE AND DIRECTION BY ELECTROMAGNETIC WAVE ENERGY

Edmond M. Deloraine, New York, N. Y., assignor to Federal Telephone and Radio Corporation, New York, N. Y., a corporation of Delaware Application October 26, 1943, Serial No. 507,664

12 Claims. (Cl. 343—5)

1

This invention relates to radio locating systems and more particularly to a system for determining the direction and/or distance of one or more selected points with respect to a mobile unit such as a ship, airplane, tank or truck without attracting the attention of unauthorized persons such as the enemy in times of war.

One of the objects of the invention is to provide a radio locating system by which the direction and/or distance to certain points as well as to reflecting obstacles with respect to the radio locating device may be readily determined; and this determination made with a high degree of secrecy and immunity from interference by unauthorized persons.

Another object is to provide portable location repeaters of small compact size capable of being secreted in enemy territory, or at other points the location of which may later be desired, which are triggerable only by a given radio signal or signals.

Still another object is to provide a radio locating device for use with location repeaters or radio markers wherein the device is adapted to transmit signals to trigger the repeaters and detect for direction, distance and/or identity determination the return signals of the repeaters.

A still further object of the invention is to provide a system utilizing a radio locating device and one or more location repeaters wherein complete detection and/or jamming by unauthorized persons of the transmission between the radio locating device and the repeaters is rendered exceedingly difficult.

Briefly, the above and other objects of the invention are accomplished in accordance with the principles of the invention by the combination of a radio locating device and a plurality of location repeaters adapted to be positioned at points the location of which with respect to the radio locating device is desired without attracting the enemy's attention. Each of the repeaters includes means triggerable only by a given signal transmitted by the radio locating device and means to transmit a signal of some characteristic chosen for identification of that particular repeater in response to each triggering operation caused by the reception of said given signal. The radio locating device includes means to transmit the triggering signal together with means to detect the repeater signals and for determining the direction and distance to the source of the repeater signals and also the identity of the repeater producing such signals.

In order to render the system substantially free from detection and interference by unauthorized persons, the operation of the radio locating system is varied continuously over a wide band of frequencies. That is to say, the transmitter and receiver circuits of the device are varied simultaneously and the signal transmission is timed so that succeeding signals transmitted occur at different frequencies. The repeaters may each be differently tuned so that for a given number of repeaters not more than one will be triggered by a signal of the same frequency. A given group of repeaters, of course, may be tuned to the same frequency where the simultaneous indication of a given area or route is desired. The rate of change in the transmission frequency, however, is such that the reception of repeater signals in either case is satisfactory.

As will be made more clear hereinafter, the locating device may be relatively simple or quite elaborate in its equipment and functions. For example, the device may comprise a simple transmitting and direction finding equipment or it may include additional means for determining the distance to a particular location repeater, means to determine from the character of the repeater signal the identity of the repeater or frequency varying means as hereinbefore mentioned to render it more secretive and less subject to jamming attempts.

The repeater may also be of simple construction or more elaborate depending upon the functions required. One form of repeater may include a simple pulse transmitting and receiving circuit capable of being triggered by a pulse signal at a given frequency and transmit in return a signal at the same or another frequency. Still other forms of repeaters may include such features as means responsive only to a signal of a given character, transmitting means to transmit a return signal characterized by a special pulse form or shape, or the repeater may include a main source of power with means for connecting the source in circuit only when the repeater is triggered.

From the foregoing brief description and the detailed description to follow hereinafter, it will be clear that the system of this invention has a great many different applications. For example, the system could be used to give to the party in charge of the radio locating device the knowledge of the positions of a plurality of location repeaters in situations where it is desirable to keep such positions secret from the enemy. The repeater would not normally transmit and consequently would not be detected by radio listening means of the enemy as long as it is not triggered by the radio locating device. Where the radio locating device includes the frequency variation above referred to, detection of repeater operation will be exceedingly difficult because of the large intervals between the triggering operations and also because of the wide frequency band operation of the triggering device. Furthermore, the triggering operations for the most part will only be of very short duration thereby limiting detection to a short interval.

For a more complete understanding of the invention, reference may be had to the following detailed description to be read in connection with the accompanying drawings, in which:

Fig. 1 is a schematic block diagram of the radio locating system including a radio locating device and a plurality of location repeaters located at tactical points on enemy territory;

Fig. 2 illustrates in block diagram one form of frequency variator control that may be used in the system shown in Fig. 1;

Fig. 3 is a schematic block diagram of a location repeater;

Figs. 4, 6 and 7 are schematic block diagrams of three forms of signal generators that may be used in the repeater circuit of Fig. 3;

Fig. 5 is a graphical illustration of repeater signals that may be generated in accordance with the principles of the signal generators shown in Figs. 4 and 6; and Fig. 8 is a graphical illustration used in explaining the operation of the radio locating system.

Referring to Fig. 1 of the drawings, the radio locating system is shown to include a local radio locating device 10 and a plurality of location repeaters X, Y, Z, etc., the repeaters being shown in block form and located at tactical points in enemy territory. The radio locating device is generally similar to the usual form of obstacle detecting and ranging equipment whereby a detection pulse is transmitted and reflections produced by obstacles such as aircraft and ships are detected for determination of direction and distance. In fact, the radio locating device may be used for this purpose as well as for locating the direction, distance and identity of a particular location repeater.

The radio locating device includes a transmitting antenna 12 associated with an R. F. oscillator 14 which may be of any known character or of the type disclosed in the copending application of Ross B. Hoffman, Serial No. 467,192, filed November 28, 1942, now Patent No. 2,490,808 issued Dec. 13, 1949, wherein the operating frequency of the oscillator is continuously varied over a wide band of frequencies. As shown in Fig. 1, the latter form is illustrated and the variation of the operating frequency of the oscillator is controlled by a variator 16. The variator in turn is controlled by a synchronizer 18 which also produces timed pulses 19 which are applied to a signal generator 20 for production of a given signal such as indicated at 21, 23. The given signal 21, 23 is applied to the oscillator 14 for transmission.

The signal generator 20 may comprise any suitable form whereby a pulse of a given character, such as a given plural pulse arrangement or a given pulse width, is produced. The signal generator shown in Fig. 1 includes a delay device 24 which is fed with pulse energy from the synchronizer 18 for retardation according to the retardation characteristics of the device 24. The retarded pulse energy is added to the pulse energy from synchronizer 18 by switch connection 26 to line 28 which by-passes the device 24 thereby producing the double pulse signal 21, 23. It will be understood that by maintaining the switch 26 open, the signal will constitute a single pulse such as pulse 19.

The receiving and indicating features of the radio locating system of Fig. 1 are shown to include a directional antenna 30 which may be of known character utilizing an array of antenna elements for beaming the radiation pattern for sharp direction determinations. The antenna 30 may be continuously rotated by a motor 32 under control of azimuth indicator 35, or the antenna may be manipulated directly by hand by the manual control means 34. The antenna 30 is connected by lines 36 to a receiver unit 38 including R. F. and I. F. stages. The tuning of the R. F. stages is preferably varied according to the frequency of the oscillator 14. This variation is effected by control from the variator 16 and may be performed in the manner disclosed in the aforesaid copending application of Ross B. Hoffman. The receiver circuits of unit 38 are blocked by connection 40 from the synchronizer 18 when signal pulses are transmitted by the device.

The indicator feature of the system includes a cathode ray oscillograph 42 the sweep of which is controlled by a sweep generator 44 timed by the synchronizer 18. The signals received by the unit 38 are applied to movable contact 46 which may be connected with either circuit connection 48 or 60. As shown, the contact 46 is closed with circuit 48 which includes a known form of detector 50 connected through switch contacts 51 and 52 to the deflecting circuit 54 of the oscillograph 42. This detector circuit connection provides for the ordinary detection of signal pulses received from repeaters or those signals comprising reflections of the transmitted pulse produced by obstacles such as aircraft and ships. The deflection of the cathode ray beam produces an indication on the screen of the oscillograph whereby the distance to the repeater or obstacle producing the received pulse may be readily determined by a distance scale 56 or by other known elapsed time measuring systems.

Where the location repeaters are adjusted or arranged to produce identifying signals differing in pulse width, or the number and spacing of pulses, the identity of the repeater producing a particular signal may be determined by viewing the pulse structure and spacing of the signal on the screen of the oscillograph 42.

Assume, for example, that each location repeater is tuned to transmit a repeater signal at a frequency different from the operating frequencies of other repeaters. The identity of the repeater producing a given pulse signal may be determined by changing movable contact 46 to circuit connection 60, thereby connecting in circuit a narrow band filter 62 ahead of the detector 50. By adjustment of the filter 62, all repeater pulses may be eliminated except the pulses of the repeater tuned to a particular frequency. Or, in other words, by adjustment of the filter to a particular frequency only those repeater pulses produced by the repeater or repeaters tuned to that particular frequency will be detected and indicated on the screen of the oscillograph 42.

Besides tuning the repeaters to different operating frequencies, they may also be provided with signal producing means arranged to produce pulse signals differing in character from those produced by other repeaters. Thus, the identity of a station may be checked by both the frequency of the repeater signal and the formation of the repeater signal as observed on the screen of the oscillograph or by other metering equipment.

The location repeaters may be provided with pulse generators which produce signal pulses of different widths, that is, the pulse signals produced by one repeater will be different in width from the pulse signals produced by other repeaters. This form of identification will be detected by shifting switch contact 46 to contact 48 and shifting switch contact 52 to contact 53. This circuit connection will include detector 50 in series with a pulse width discriminator 64. The circuit of the discriminator 64 may be of the character disclosed in the copending application of E. Labin and Donald D. Grieg, Serial No. 487,072, filed May 15, 1943, United States Patent No. 2,440,278, dated April 27, 1948, whereby pulses of a given width may be segregated from a train of pulses of different widths. By adjusting the discriminator 64 for the pulse width of a particular repeater, the circuit will only pass pulse energy of that particular width. Conversely, by varying the adjustment of the discriminator, repeater pulses of different widths can be received and the identity of the repeater or repeaters producing the pulses may be determined according to the adjustment of the discriminator.

While the frequency variator control 16 may be of the character disclosed in the aforesaid Hoffman application wherein motor driven mechanical means are used for varying the frequency, this variation may be accomplished by non-mechanical means. In Fig. 2, the frequency control is provided for by a pair of reactance tube modulators 71 and 72. Reactance tube 71 is connected to a tank circuit of the oscillator 14a and reactance tube 72 is connected to the tank circuit of the first R. F. stage of unit 38a. The reactance tube modulators are fed by a suitable voltage wave such as saw-tooth wave 74 or sine wave 75. The saw-tooth wave 74 is produced by a generator 76 while sine wave 75 is produced by generator 77, the two generators being selectively connected, depending on whether a saw-tooth wave or a sine wave is desired, by switch 78 to synchronizer line 17 whereby the wave is maintained in synchronism with the transmission of detection pulses. Thus, the system according to the variator control of Fig. 2 is varied continuously over a wide band of frequencies according to the wave form, either 74 or 75, thus rendering it difficult for unauthorized persons to detect or interfere with the detection function of the system.

Each location repeater is constructed along the lines shown in Fig. 3. The repeater is so constructed as to form a small compact unit and since the system operates preferably at ultra high frequencies, it is provided with a relatively small antenna 80. The antenna 80 is used both for receiving the triggering signal and for transmitting the signal identifying the repeater. The antenna 80 is connected by line 82 to a detector 84. Assuming that the triggering signal comprises pulses 21 and 23 of Fig. 1, having a given interval therebetween, the signal will trigger the repeater into operation.

This triggering operation is effected by a circuit including a delay device 86 and a vacuum tube 88. The output of the detector 84 is connected to the input 87 of the delay device and to a grid 89 of the tube. The output of the delay device is connected to a grid 90 of the tube 88. The plate 91 is connected through load resistor 92 to a source of positive potential. The control grid 90 is biased negatively by a negative source of potential through resistor 94 whereby the tube 88 is normally biased to cut-off and is non-responsive to the input energy of a single pulse. The delay device 85, however, is of such retardation characteristics as to retard pulse 21 an amount corresponding to the time interval between the pulses 21 and 23. Thus, the output of the delay device for pulse 21 will coincide with the energy of pulse 23 applied on grid 89, and the combined energy thereof overcomes the negative bias on the tube sufficiently to produce a single output pulse 95. Other combinations of pulses will not operate the tube 88 since the energy of two pulses having a time spacing different from that of pulses 21, 23 will not produce the combined energy required to operate the tube.

The pulse 95 from tube 88 is applied to a signal generator 96 which may be of any one of the forms illustrated in Figs. 4, 6 and 7, or may even be omitted should it be desired that the repeater merely reproduce a single pulse at a given frequency in response to a triggering operation. In the latter case, the pulse 95 would be applied directly to the oscillator 98 which is connected to the antenna 80.

Should it be desirable for the repeater to reproduce a double pulse signal of the spacing of pulses 21, 23, then a blocking circuit 99 may be inserted between the detector 84 and oscillator 98 for blocking purposes during the operation of this oscillator, otherwise, the blocking circuit 99 may be omitted.

Where the repeaters are to be used within a short time, that is within two or three days more or less, the unit may be provided with sufficient batteries to last that period or even longer depending on the permissible size and weight of the repeater. It is possible, however, that it may be desirable to prolong the power of the unit for a much longer period than is possible by having the source of power continuously connected to keep the repeater circuits all energized. The repeater circuit of Fig. 3, therefore, may be constructed along the lines of the repeater disclosed in the copending application of H. G. Busignies, entitled "Repeater Control System," Serial No. 507,704, filed of even date, United States Patent No. 2,444,426, dated July 6, 1948, wherein a control 100 is included for connecting into the oscillator and other circuits the power supply only when the repeater is triggered by the proper signal. This control includes a switch 102 connected to a power supply 104 in parallel with the switch 105. The input to the control unit 100 is controlled by switch 106 which may be, if desired, ganged by connection 107 to switch 105. Thus, when switch 106 is opened the switch 105 is closed thereby supplying power directly to the oscillator 98 for continuous use. When the gang control 107 is operated to open switch 105, switch 106 is closed thereby placing the unit 100 under control of the triggering signal which is applied to the control grid 108 of a gas-filled tube 110. This tube has a self-biasing circuit having a time constant adapted to maintain the tube firing long enough to operate a slow release relay 112 controlling the switch 102. While the control unit 100 is shown to control the power supply of the oscillator 98 only, it will be understood that it may also control the power supply to other parts of the repeater such as the signal generator 96, the detector 84, of course, being continuously energized so as to receive triggering signals. The timing of the triggering pulses and the operation of the relay are so selected that the relay remains closed for a period equal to the duration of any train of triggering signals detected by the repeater.

In Fig. 4, a form of signal generator 96a is shown whereby a composite signal is produced for identification of the repeater producing such signal. The generator 96a includes an input connection 120 adapted to receive pulses 95 which are applied over lines 121 and 122. The line 121 is connected directly to the output connection 124 for application to the oscillator while line 122 is applied to a delay device 126 whereby energy of the pulse 95 is delayed as indicated at 127. If it is desired to reshape the pulse 127 because of attenuation caused by the retardation, a pulse shaper 128 may be provided as shown to sharpen the pulse as indicated at 129. The pulse 129 is therefore retarded with respect to pulse 95 by an interval corresponding to the retardation effect of delay device 126. This provides a composite pulse signal which identifies the repeater.

It will be understood that additional parallel branches may be provided each having a delay device and pulse shaper as shown for circuit 122, whereby various arrangements of three, four or more pulse signals may be produced according to the adjustments of the delay devices of such circuits.

Fig. 5, for example, shows a number of different signals that may be made up of two, three and four pulse combinations. Curve a shows a composite pulse according to the output of the pulse generator of Fig. 4. Curve b shows a similar signal except that the interval between pulses has been increased. Curve c shows a three pulse signal having interval spacing similar to the pulses of curve a. Curves d, e and f show variations in the formation of three pulse signals while curves g through m show variations of four pulse signals. Additional pulse combinations may be made by adding another pulse as will be clear.

Fig. 6 shows still another form of signal generator 96b for producing composite signals such as illustrated in Fig. 5. This generator is shown with three parallel circuits for the purpose of illustrating the production of a composite signal having three pulses. The three square wave generators are adjusted to produce pulses of different widths as indicated at 134, 135 and 136. These square wave pulses are applied to modulator tube circuits 137, 138 and 139, respectively, the tubes being biased at or near cut-off and driven to saturation by the square pulses. The plates of these tubes are connected in parallel by lines 141, 142 and 143 to a source of current through a damped resonant circuit 140 which controls the pulse output caused by conduction of the tubes in response to the square waves applied to the grids thereof. As the leading edge of pulse 134, for example, is applied to tube 137, current is drawn through circuit 140 thereby producing negative pulse 145. The trailing edge of pulse 134 terminates the flow causing a positive pulse 146. Since the leading edges of all the square pulses 134, 135 and 136 are timed together, the negative pulses produced therefrom all coincide, but since the trailing edges of pulses 134, 135 and 136 are staggered in time, the positive pulses 146, 147 and 148 are staggered. This results in a composite pulse 149 which is transmitted, the negative pulse energy being negative fails to modulate the oscillator.

It will be understood that by changing the time constants of one or more of the square wave generators, any one of the signals of curves c, d, e and f (Fig. 5) may be produced. It will be also understood that by including additional pulse producing circuits to the parallel circuits shown in Fig. 6 still more composite signals may be produced.

The above described multivibrator-modulator arrangement can be built in a smaller and lighter unit than a comparable unit made of delay lines since the latter, to effect even a small retardation of a few microseconds, requires considerable length of artificial line or network. It will be understood, however, that the pulse shaping means associated with the multivibrators 131, 132 and 133 may be of arrangements other than shown. For example, differentiators with or without the addition of a clipping amplifier may be used.

Another method of identifying the location repeaters is by generating square waves of different widths in the place of the composite signals of Fig. 5. This may be accomplished by using a known square wave generator 150 such as indicated in Fig. 7. The generator 150 may comprise, for example, a multivibrator circuit with the time constants thereof adjusted to produce an identifying signal of a given width. This form of generator is even simpler and requires less parts and space and is lighter in weight than either of the forms illustrated in Figs. 4 and 6.

Regardless of the composite pulse character or other shape of the repeater signals, the time elapsed between transmission of the detection signal and reception of a repeater signal is measured with reference to the leading edges of the two signals.

The operation of the radio locating system will now be explained with particular reference to Fig. 8 which shows a set of curves all having the same time base and representing the operation of the different embodiments hereinbefore described. The saw-tooth wave 160 of curve A represents the variation in frequency of the radio locating device of Fig. 1 according to the variation control effected by variator 16 as when the variator is constructed according to the form shown in Fig. 2, and the switch 78 is closed to connect line 17 to the saw-tooth generator 76. It will be apparent that when the saw-tooth voltage 74 is applied to the reactance tube modulators 71 and 72 that this modulation varies the frequency of the oscillator and the R. F. stage of the receiver unit 38 over a wide band of frequencies according to the wave 160 of curve A (Fig. 8).

Assuming that the transmitting circuit of the device shown in Fig. 1 is arranged to transmit double pulse signals at equally timed intervals of 120° with respect to the cycles of the frequency variation, there will be three such signals transmitted for each cycle of frequency variation. These three signals $x$, $y$ and $z$ will thus occur at different frequencies $f_1$, $f_2$ and $f_3$ respectively. It will be understood, of course, that many more signals than the three shown may be provided for each cycle of frequency variation depending on the width of the frequency band through which the variation swings and the separation between the different frequencies of the succeeding pulses necessary to prevent improper triggering of the repeaters.

It will be clear that wave forms other than a sawtooth may be used for controlling the variation in frequency. An example of another control wave is shown by curve B, Fig. 8, wherein the variation follows the pattern of the sine wave 162. By using the same relative timing for the pulses $x$, $y$ and $z$, they may be made to occur at frequencies $f_4$, $f_5$ and $f_6$ respectively. This relation of the different frequencies for the transmission of pulses $x$, $y$ and $z$ may be changed by shifting the phase of the sine wave 75 (Fig. 2) used for producing the frequency variation, or by changing the period of the sine wave 75 with respect to the timing of the signal pulses.

Curves $C_1$, $C_2$ and $C_3$ of Fig. 8 represent repeater pulses received at the locating device 10 of Fig. 1 from repeaters X, Y and Z. Referring to Fig. 3 of the drawings, it will be observed that the repeater is adapted to be triggered by double pulse signal 21, 23 and that either a single pulse, a composite pulse or a square pulse of given width is transmitted back by the repeater, the form of repeater pulse depending upon the character of signal generator 96. Curves $C_1$, $C_2$ and $C_3$ represent the reception of single repeater pulses of narrow duration but at different frequencies $f_1$, $f_2$ and $f_3$ respectively, corresponding to the frequencies indicated on curve A. Reception of pulse $x_1$ produced by repeater X in response to the triggering signal $x$, will be indicated on the screen of the oscillograph 42 of Fig. 1 whereby the distance as measured in elapsed time $T_1$ is readily determined between the transmission of the signal $x$ and the reception of repeater signal $x_1$, an allowance being made, of course, for any delay occurring between the triggering of a repeater and the transmission of the repeater pulse.

The reception of the repeater pulse $x_1$ may be separated from the reception of other repeater signals such as pulses $y_1$ and $z_1$ by closing the switch 46 with circuit connection 60 and by proper adjustment of filter 62 to the frequency $f_1$. By proper manipulation of the directional antenna 30 through control of the motor 32 or the manual control 34, the azimuth of the position of the location repeater with respect to the location of the device 10 may be determined on indicator 35 for the maximum signal reception observed on the oscillograph 42. Thus, by transmitting a series of triggering pulses according to frequency variation A or B, or even at a single frequency such as $f_1$, the distance and azimuth of the repeater X may be quickly determined. If the transmission of triggering pulses follows the frequency variation of curves A or B, the timing between reception of repeater pulses from repeater X, for example, will be three times the interval between the successive triggering pulses transmitted. This variation of frequency transmission and the long intervals between triggering pulses of the same frequency render it exceedingly difficult for an unauthorized person to determine by chance detection of the transmission at one or another of the transmitting frequencies to determine the purpose of the transmission, the location of the repeater or the radio locating device, or to effectively interfere with the locating function of the system.

It follows from the foregoing description of the triggering operation of repeater X that the repeater pulses $y_1$ and $z_1$ from repeaters Y and Z will be received in response to the triggering pulses $y$ and $z$ respectively, at frequencies $f_2$ and $f_3$ (curve A) in the relation shown in curves $C_2$ and $C_3$. The azimuth of the repeaters Y and Z as well as the time intervals $T_2T_3$ thereof will be determined in the same manner as described for repeater X.

Curves $D_1$, $D_2$ and $D_3$ of Fig. 8 represent the reception of repeater signals where the signals from different repeaters are distinguished by the formation of the signal. Repeater signal $x_2$, for example, corresponds to the composite pulse of curve $a$ (Fig. 5), repeater pulse $y_2$ corresponds to the composite pulse of curve $b$ and the repeater pulse $z_2$ corresponds to the composite pulse of curve $c$. These composite pulses may be produced by the different repeaters by providing the repeaters with signal generators according to either of the forms shown in Figs. 4 and 6, the generator in either case being adjusted to produce the desired composite signal. The character of the composite pulse is determined by its appearance upon the oscillograph 42.

Curves $E_1$, $E_2$ and $E_3$ of Fig. 8 represent repeater pulses where they differ in width. The repeaters, in such case, will be provided with square pulse generators according to Fig. 7 and will be differently adjusted so as to produce different width repeater pulses as indicated by pulses $x_3$, $y_3$ and $z_3$. The repeater pulses will be discriminated at the locating device 10 by closing switch 52 with circuit connection 53 thereby applying the pulse energy received to the pulse width discriminator 64. By adjusting the discriminator 64 until pulse energy is passed gives the measurement of the pulse width and thereby identifies the repeater from which the pulse is received.

Besides the function of detecting the location of repeaters, the locating device 10 may be used for detecting the presence of enemy aircraft and ships. This function may be performed by adjusting the signal generator 20 of Fig. 1 to pass the single pulse 19 whereby transmission of detection pulses 170 (curve G Fig. 8) is effected. While curve G represents the transmission of pulses 170 at the same frequency, it will be clear that they may be transmitted at different frequencies according to the frequency variation of curves A or B, as the case may be, and that energy of reflection pulses 172 may be passed directly from the receiving unit 38 through detector 50 and thence to the deflecting electrodes of the oscillograph 42. Also, the oscillator 14 may be stepped up in power to transmit detection pulses of greater amplitude.

While several embodiments and variations of the invention have been illustrated and described, it is recognized that many additional embodiments and variations are possible without departing from the invention. It is to be understood, therefore, that the particular apparatus shown and described are given by way of illustration only and not as limiting the objects of the invention and the appended claims.

I claim:

1. A radio location determining system comprising a transmitting and receiving device and a repeater, the location of which with respect to said device is desired; said repeater having means triggerable only by a given signal comprising a pair of pulses spaced apart by a given time interval, and means to transmit a signal of a given characteristic identifying said repeater in response to each triggering operation; and said device having means to transmit said given signal and means to detect the repeater signal, said device includes means for varying the transmitting means and the detecting means thereof continuously over a given frequency at a rate such that the repeater signals are detected at substantially the same instantaneous frequency.

2. A radio location determining system comprising a distance and azimuth determining device and a plurality of location repeaters adapted to be positioned at points the location of which with respect to said device is desired; each of said repeaters having means triggerable only by a given signal comprising a pair of pulses spaced apart by a given time interval, and means to transmit a signal of a given characteristic identifying said repeater in response to each triggering operation; and said device having means to transmit said given signal and means to detect and distinguish the different repeater signals, said device includes means for varying the transmitting means and the detecting means thereof continuously over a given frequency band at a rate such that the repeater signals are detected at substantially the same instantaneous frequency.

3. A radio location system comprising a transmitter and a receiver, means for simultaneously and cyclically varying the frequency of said transmitter and receiver over a given frequency range at a relatively slow rate, means for energizing said transmitter periodically at a relatively rapid rate to transmit pulses having a given modulation characteristic, repeater means located in the field of said pulse transmissions each responsive to pulses of a different frequency within said given range and having said given modulation characteristic for reradiating pulses of a distinct modulation characteristic at its respective responsive frequency, said receiver responsive to said reradiated pulses for producing an indication timed with respect to the periodic transmissions.

4. An arrangement according to claim 3, wherein said receiver comprises a cathode ray tube, a sweep voltage generator for said cathode ray tube synchronized with said means for energizing for producing a time base trace on the screen of said cathode ray tube, and means for coupling the output of said receiver to said cathode ray tube to produce an indication on said time base trace.

5. An arrangement according to claim 4, wherein said coupling means comprises an adjustable circuit for selectively applying the reradiated pulses having a given modulation characteristic to said cathode ray tube.

6. An arrangement according to claim 5, characterized in that said receiver comprises a directional antenna and means for sweeping the reception pattern of said antenna in the path of said reradiated pulses for determining the azimuth of said repeater means with respect to said antenna.

7. The system defined in claim 1 wherein the repeater signal produced by said repeater is characterized by the transmitting means of said repeater including means to produce a pulse signal of a given width, and the means for detecting said repeater signal includes a pulse width discriminator whereby an operator can determine by the width of the repeater signal received the identity of the repeater producing such signal.

8. A radio location determining system comprising a transmitting and receiving device and a plurality of location repeaters adapted to be positioned at points the location of which with respect to said device is desired; each of said repeaters having means triggerable by a given signal only at a predetermined frequency and means to transmit a repeater signal in response to each triggering operation at a selected narrow frequency; and said device having means to transmit said given signal, means to detect the repeater signals, means to vary continuously over a given frequency band the frequency at which the transmitting means and the detecting means of said device operate at a rate such that the repeater signals are detected at substantially the same instantaneous frequency, and means to control the transmitting of said given signal at frequencies in said given frequency band corresponding to the narrow frequency bands of said repeaters.

9. The system defined in claim 8 wherein the signal produced by each of said repeaters is characterized by the transmitting means of such repeater including means to produce a pulse of a width different from the widths of other repeater produced pulses.

10. The system defined in claim 8 wherein the transmitting means of said repeaters distinguish themselves one from the other by signals having at least one predetermined distinguishing characteristic, and the detecting means of said device includes narrow band filter means, pulse width discriminating means and an oscillograph to determine the identity of the repeater producing a particular signal.

11. The system defined in claim 2, wherein the repeater signals produced by said repeaters are distinguished from each other by the transmitting means of the different repeaters having means to produce a pulse of a width different from the widths of the other repeater produced pulses.

12. A radio location determining system comprising means to transmit pulse signals, a plurality of repeaters the positions of which with respect to said transmitting means are desired, each of said repeaters having means triggerable by a given signal only at a predetermined frequency within the frequency band of said transmitting means, means to receive pulses radiated by said repeaters in response to said pulse signals at a rate such that the repeater signals are detected at substantially the same instantaneous frequency, and variator means to continuously vary the operating frequency of both the transmitting means and the receiving means, said variator means including a pair of reactance tube modulators, means connecting one of said modulators to said transmitting means to vary the operating frequency thereof in accordance with the reactance value of said modulator, means for connecting the other of said modulators to said receiving means to vary the operating frequency thereof in accordance with the reactance value of such modulator, voltage wave producing means, and means for applying the voltage wave to said modulators to vary the reactance thereof according to the wave form of said voltage.

EDMOND M. DELORAINE.

REFERENCES CITED

The following references are of record in the file of this patent:

UNITED STATES PATENTS

| Number | Name | Date |
|---|---|---|
| 1,464,096 | Hartley | Aug. 7, 1923 |
| 2,011,392 | Bentley | Aug. 13, 1935 |
| 2,134,716 | Gunn | Nov. 1, 1938 |
| 2,198,113 | Holmes | Apr. 23, 1940 |
| 2,211,942 | White | Aug. 20, 1940 |

(Other references on following page)

UNITED STATES PATENTS

| Number | Name | Date |
|---|---|---|
| 2,227,598 | Lyman et al. | Jan 7, 1941 |
| 2,248,727 | Strobel | July 8, 1941 |
| 2,252,083 | Luck | Aug. 12, 1941 |
| 2,266,401 | Reeves | Dec. 16, 1941 |
| 2,301,929 | Budenbom | Nov. 17, 1942 |
| 2,403,626 | Wolff et al. | July 9, 1946 |
| 2,405,238 | Seeley | Aug. 6, 1946 |
| 2,405,239 | Seeley | Aug. 6, 1946 |
| 2,411,520 | Capen | Nov. 26, 1946 |
| 2,416,591 | Muntz et al. | Feb. 25, 1947 |
| 2,419,570 | Labin | Apr. 29, 1947 |
| 2,419,571 | Labin | Apr. 29, 1947 |
| 2,433,804 | Wolff | Dec. 30, 1947 |
| 2,453,970 | Charrier | Nov. 16, 1948 |

FOREIGN PATENTS

| Number | Country | Date |
|---|---|---|
| 116,666 | Australia | Oct. 10, 1941 |
| 528,192 | Great Britain | Oct. 24, 1940 |